United States Patent [19]

Hack

[11] 4,260,045
[45] Apr. 7, 1981

[54] HINGE LOCK

[76] Inventor: Eugen Hack, Kobergerstrasse 66, 8500 Nuremberg, Fed. Rep. of Germany

[21] Appl. No.: 1,349

[22] Filed: Jan. 5, 1979

[30] Foreign Application Priority Data

Jan. 14, 1978 [DE] Fed. Rep. of Germany ....... 2801618

[51] Int. Cl.³ .............................................. F16D 67/00
[52] U.S. Cl. .................................................... 192/8 R
[58] Field of Search ...................... 192/8 R, 12, 45, 38; 188/31

[56] References Cited

U.S. PATENT DOCUMENTS

| | | | |
|---|---|---|---|
| 2,583,428 | 1/1952 | Houplain | 192/8 R |
| 2,597,798 | 5/1952 | Houplain | 192/8 R |
| 2,993,569 | 7/1961 | Cole | 192/8 R X |
| 3,051,282 | 8/1962 | Greene | 192/8 R |
| 3,240,300 | 3/1966 | McKay | 192/8 R |
| 3,300,013 | 1/1967 | Fisher | 192/8 R |
| 4,052,910 | 10/1977 | Olt et al. | 192/8 R X |

Primary Examiner—Nile C. Byers, Jr.
Attorney, Agent, or Firm—Jordan and Hamburg

[57] ABSTRACT

A hinge lock which during standstill of a primary control shaft, locks a driven shaft actuating a control element and connected by a gear drive to the control shaft. The arrangement is particularly adapted for control hinges of slats on large aircraft, in which a tangential key free-wheel lock is connected to the driven shaft with at least two tangential keys facing each other and locking in one direction of rotation. An engaging element driven by the primary control shaft, shifts a key release between the tangential keys, depending on the direction of rotation. A transmission is connected between the primary control shaft and the auxiliary shaft such that the speed of the auxiliary shaft is a multiple of the speed of the rotating body of the tangential key free-wheel lock.

19 Claims, 12 Drawing Figures

HINGE LOCK

BACKGROUND OF THE INVENTION

The present invention relates to a hinge lock which upon standstill of a primary control shaft blocks a driven shaft which actuates a control element and which is connected to the control shaft by a gear drive, particularly for the control hinges of slats on a giant aircraft.

The controllable slats on the leading edges of the wings of giant aircraft present, for safety reasons, the problem of instantly and absolutely rigidly blocking the controllable hinged arrangement of these slats in case of a break inside the hinge elements or in case of failure of the driving control force. This means that the control movement must proceed from the absolute fixation and rigidity of the hinges and must terminate instantly in rigidity upon ceasure of the control activity. It is necessary to consider the forces resulting from the high starting and landing speeds which are confronted by disproportionately lower control forces. The rotary speeds are such that the drive and control shafts with small torques perform a very slow fractional rotation, like the conventional servomotors. By interposing a gear reduction drive between drive shaft and the control shaft acting on the driven shaft, a suitable adaptation of the rotary speeds can be achieved.

Accordingly, it is an object of the present invention to provide a hinge lock of the preceding species with a tangential key free-wheel lock connected to the driven shaft, with at least two facing tangential keys locking in one rotary direction and an engaging element, driven by the primary control shaft; this engaging element moves a key release between the tangential keys into a release position.

SUMMARY OF THE INVENTION

The tangential key free-wheel lock in accordance with the present invention comprises two counter-locking tangential key free-wheel clutches which, when engaged, prevent the shaft coupled to it, or the hinge axis, respectively, from rotating in any direction. If the slats are to be actuated, i.e., if the primary control shaft provided for that purpose rotates, the key release is actuated via the engaging element. This key release, depending on the direction of rotation, forces either of the tangential keys from its locked position and hence allows a rotation of the driven shaft upon control shaft actuation.

It is evidently important that the shifting of the tangential key by the key release takes place immediately after the start of the primary control shaft, when the hinge axis does not yet make a pivoting movement so that the key cannot "seize" (freeze). For this purpose there are three fundamental embodiments which correspond to the three cases where the hinge lock is directly between the high-speed drive shaft and the driven shaft, second, where a planetary gear drive is located between drive or control shaft and driven shaft, and, thirdly, without requiring a planetary gear drive, the hinge lock is arranged between the control shaft whose speed is reduced relative to the drive shaft and which turns more slowly, and the driven shaft. This third embodiment best represents the concept of the present invention.

A first embodiment provides that the release action of the tangential key proceeds immediately from the high-speed control shaft and that the engaging element includes a high-speed auxiliary shaft, with a gear transmission between the primary control shaft and the auxiliary shaft such that the speed of the auxiliary shaft is a multiple of that of the rotating body of the tangential key free-wheel lock. By a sufficiently large gear ratio it is possible to provide that the auxiliary shaft or the engaging element has already moved the key release for actuating the tangential key before the much slower driven shaft, first locked and now to be released, has moved appreciably. This rapid response of the key release, however, may result in the release forces remaining relatively small so that in this manner the release of a jammed key is not possible, for example, when the slats are temporarily stopped during retraction. During further run-in after stopping, the tangential key involved must be released from the jammed position since during the stoppage it was loaded by the great force of the wind pressure. The possibilities of wedge release are described in detail further below.

The hinge lock with great force and securely engaging hinge lock can be provided by a driven shaft with a preferably center-symmetrical out-of-round cross section which forms, with the cylindrical interior wall of a stationary housing, the key gap for the oppositely directed tangential keys which are to be spring-loaded in a manner known in the art in the locking direction. It is self-understood that an inverse construction is possible, i.e., center-symmetrical out-of-round design of the interior wall of the stationary housing for a cylindrical rotating body. The center-symmetrical design of the cross section means that for each rotation direction there are at least two diametrically opposed tangential keys. Thus one-sided loads are avoided, since the radially directed transverse forces cancel each other; with paired tangential keys, two engaging elements and key releases must, of course, be provided between two opposite tangential keys, since always two of the tangential forces must be released at the same time for releasing the driven shaft.

In a further embodiment of the present invention, the key release may be a control element disconnectable from the auxiliary shaft via a ratchet or slipping clutch, etc. against spring action from its neutral middle position, engaging either tangential key. It has been found particularly advantageous when the key release is a cam element coupled to the auxiliary shaft and equipped preferably with a pivot limit stop. This cam element is seated in the manner of a jaw or disk brake clamping the auxiliary shaft and is taken along during its rotation and disengages one of the tangential keys. After a predetermined pivot angle, the pivot limit stop prevents further movement and the cam slips through on the auxiliary shaft, while it remains in its deflected position and the tangential key remains in its release position. The engaging force, caused by friction, in the rotary direction is, of course, selected so that it exceeds the restoring force of the spring pretensioning the cam element in the neutral middle position. If the auxiliary shaft stands still due to a failure of the primary control shaft drive, the cam element is instantly returned by the spring to its rest position with the result that now the previously deflected tangential key returns to its locking position due to the spring load on it. Hence the driveshaft is instantly locked again, performing the desired safety function.

It is necessary for the functioning of the arrangement of the present invention that the restoring force of the restoring spring for the cam element is smaller than the friction force which ties the cam element to the auxiliary shaft, since otherwise a deflection could not take place at all. Hence, the return of the cam element in case of failure of the primary control shaft drive in the above-described embodiment can only proceed when the cam element including auxiliary shaft is moved jointly during the return movement of the cam element. In order to prevent in this case that the primary control shaft, the intermediate gear drive and even drive elements of the control shaft itself have to be taken along—insofar as they are not completely blocked and then would prevent return of the cam element and hence locking of the hinge lock—in a further improvement of the present invention a clutch, preferably a centrifugal clutch, is to be located between the primary control shaft element for breaking the connection between these elements when the control shaft drive fails. Due to this measure, when turning back the cam element to its neutral position, the restoring spring need only engage the auxiliary shaft, which does not make any special demands on the restoring spring. The latter may take the form of two tension springs acting in opposite directions or of a torsion spring acting in both direction of rotation.

To release the keys in the desired direction of rotation, in a further embodiment of the invention, the principle of tangential key release with the aid of deformable slip rings may be used in accordance to a prior proposal (German Patent Application No. P 27 49 271.3). Two deformable slip rings are arranged on the center-symmetrical rotating body of the tangential key free-wheel lock. These slip rings are driven by the high-speed control shaft, or by auxiliary shafts, respectively, in such a way that opposite directions of rotation of the two slip rings result and hence the deformable slip rings function as tangential key releases for the tangential keys seated on them. The angular speed of the slide rings, which is greater than that of the rotating body, ensures a secure lift-off (release) of the tangential key in the free-wheel direction, and, in case of failure of the control shaft drive, ensures instant locking of the hinge by the pretensioned tangential keys. The slip rings, each of which assists the keys of one locking direction, are connected via a gear drive to the control shaft in such a way that each slip ring always runs in one direction, regardless of the rotation direction of the control shaft. Such a gear drive can be realized, for example, by means of two installed free-wheel clutches and will not be described in detail, since such gear drives are already known in the art.

A second basic possibility to effect a reliable release of the keys is to arrange a planetary gear drive between control shaft and driven shaft and using the tooth pressure resulting there as the acting force. This can be achieved by pivotably mounting an intermediate gear of the drive between control shaft and driven shaft, pivoting about the control shaft. Then the control force transmission produces in the movable bearing of the intermediate bearing a counterpressure which presses the key release with a small pivot motion against the key to be released and thus moves it out of the clamped condition. If for any reason, for example, absence of control force, breakage of the control shaft or breakdown in the gear drive, the control force and hence the transmitting tooth pressure is not applied, the key release releases the key and the latter shifts back to its clamped position, pretensioning its adjusting spring.

A particularly expedient approach by the tooth pressure pendulum principle results when between pivot arm and key release a force transmission arrangement is provided. This arrangement has the form of a parallelogram linkage connected by joint bolts; one of its joint bolts is connected to the planet carrier and the opposite joint bolt is connected to the sliding key; the two lateral joint bolts are each under the influence of at least one tension spring which presses the parallelogram arms against lateral stops connected to the planet carrier (pinion cage). This arrangement in accordance with the present invention achieves a reliable release of the tangential keys and a safe locking of the driven shaft in case of breakdown.

A particular advantage of the hinge lock according to the present invention is that the holding force of the locking position is completely independent of the control forces, so that it is not difficult to absorb the considerable forces acting on the slats during landing or during start and to lock the driven shaft in opposition to these forces. The control force, acting via the engaging element, of the primary control shaft need only be capable of moving the tangential key to the release position. The required force can be kept very small by selecting the key angle greater than the automatic locking angle; this is possible with particular ease when using the above-described principle of deformable slip rings located between rotating body and the tangential keys.

Besides the failure of the control force, there may, in rare cases, arise troubles if a gear of the drive between the control shaft and driven shaft breaks. If such a break occurs while extending the slats, it is harmless since they are instantly pushed back in the opposite direction due to the high forces acting on the slats. In the process, the direction of rotation of the driven shaft is reversed, i.e., the tangential key which is not released and is in the locking position enters the operation and blocks further movement automatically and instantly. Hence a movement of the slats in case of a gear drive breakage is impossible if the gear drive breakage occurs during the extension movement. But if such a gear drive breakage occurs while the slats are moved to the retracted position, the air stream forces cause a further pivot movement in the same direction, i.e., the driven shaft continues to run in the same direction, though no longer driven by the control shaft, and would not be locked.

In order to ensure instant locking of the slats, a further embodiment of the present invention may provide a second auxiliary shaft, driven by the driven shaft via a transmission synchronously with the first auxiliary shaft and coupled with the latter in such a way that upon loss of synchronism the tangential key disconnected via the first auxiliary shaft is forced into its locking position.

This can be achieved in a further improvement of the present invention by constructing the coupling of the auxiliary shafts such that with a relative rotation of the auxiliary shafts the cam element deflecting the tangential key is over-rotated into a release position so that the tangential key is pushed back into the locking position under the action of its restoring spring.

In order to bring about this over-rotation of the cam element into a release position opposite the normal release position (180° apart), the second auxiliary shaft may be provided with axially shifting clamping bolts which project under spring load, while contacting a stop, into recesses of a face surface of the axially shiftable cam element whose other face surface contacts a ring shoulder of the first auxiliary shaft. During a relative movement of the two auxiliary shafts, the clamping bolts leave the recesses and press against the face surface of the cam element which, therefore, is pressed by the spring against the ring shoulder. By suitably adjusting the spring force, the resulting friction coupling can be made strong enough so that the cam element via the pivot limit stop disengages (disconnects) the tangential key even further and may pass it so that the cam element reaches the previously mentioned release position. Due to the further deflection of the tangential key, it returns with increased spring force, i.e., particularly vast, to its locking position and instantly locks the driven shaft.

In case a gear drive element breaks, the coupling of the auxiliary shafts can be disengaged by relative rotation, releasing (disengaging) the spur gear engagement of the engaging gear by axially shifting part of the coupling. With an idling control shaft, the drive of the slip rings is interrupted and an immediate locking of the hinge is ensured.

Furthermore, it would be possible not to arrange the cam element in the manner of a slip clutch clamped to the auxiliary shaft; rather, the coupling is achieved exclusively as follows. Starting with an initial synchronism of the auxiliary shafts, the jaw coupling (clutch) leads to a lengthwise shaft so that the cam element is pressed against the ring shoulder of the auxiliary shaft and the cam element is engaged in this manner. This construction has the special advantage that the above-described centrifugal clutch is not necessary since normally the cam element is not coupled to the auxiliary shaft. The slip coupling effected via such a jaw coupling (clutch) between the auxiliary shafts and the axial shift of one auxiliary shaft against the curvature of preloaded springs can be designed so that initially, by providing radial serrations there is a positive engagement so that considerable release forces can be freed to bring about a disengagement of a tangential key from the locking position.

It may be found beneficial that per direction of rotation several tangential keys, coupled for joint disengagement are provided. The coupling can be achieved, for example, by means of a center-mounted ring or star member.

A third fundamental embodiment of the present invention, which represents a particularly simple and advantageous version of the inventive concept, provides that the engaging element is rigidly connected to the control shaft, acts on the driven shaft with play and has one or several tooth segments, each of which engages at least two pivotally mounted eccentrics on a rotating body connected rotation-proof to the driven shaft; each eccentric acts on the free face side of one tangential key each and presses it during deflection from the base position against the force of a spring holding the tangential key in the locking direction into the release position and against a shoulder of the rotating body. Instead of the tooth segments one may also provide that the rotating body has at least two cams engaging corresponding recesses in each tangential key. Such a hinge lock in accordance with the present invention can be placed between the driven shaft and the control shaft turning at the nominal speed of the driven shaft, without requiring a planetary gear drive or additional auxiliary shafts. Of course, a planetary gear drive, even though not absolutely necessary, may be used. The above-described arrangement has the special advantage that even when external forces act on the driven shaft in the drive direction and the drive would be overtaken by the control shaft, no locking of the driving device occurs. This allows the use of the hinge lock in accordance with the present invention not only on slats of aircraft wings where the wind may represent such an external force, but also on ground vehicles such as runway vehicles, dump tractors, etc. where this external force arises from the downcurrent when driving downward in hilly terrain. With this embodiment provision may also be made that per rotation direction two tangential keys coupled for joint release.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
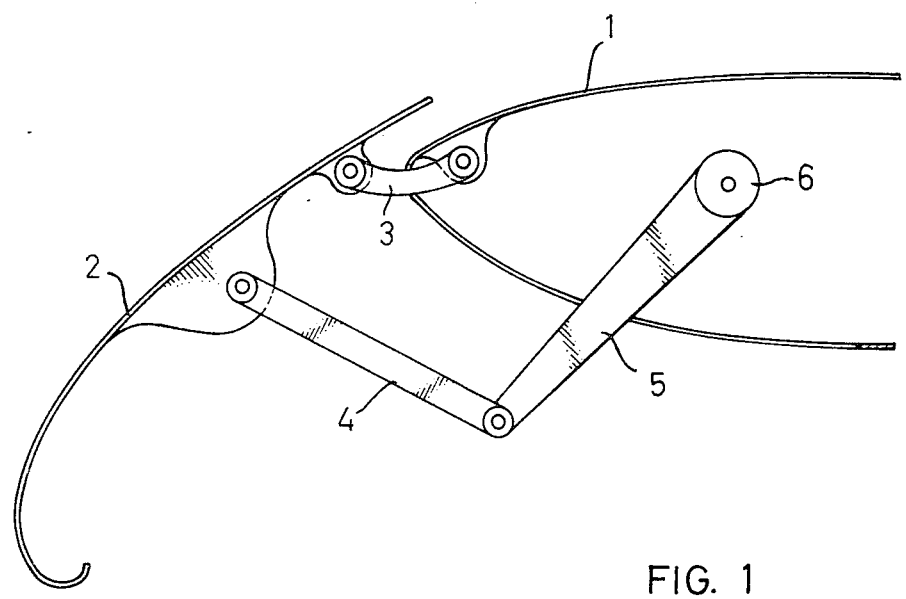
FIG. 1 shows a schematic view of a slat and its hinge arrangement.

FIG. 1 shows a schematic section through the leading edge of an aircraft airfoil 1 with a slat 2. This slat, hinged via curved straps 3 to airfoil 1 can be extended and withdrawn via a linkage 4, 5 where the lever arm 5, forming the actual control element, is connected to a driven shaft 6 which is driven by a primary control shaft 7. The primary control shaft, driven by a motor of relatively high speed is connected via a speed reduction drive, preferably a planetary drive, to the driven shaft 6 because the movement of control element 5 may proceed relatively slowly and considerably higher adjusting forces are required than the small control force of the drive motor of the primary control shaft. For example, with slats of large aircraft a pivoting movement of 150° maximum must take place in about 15 seconds, which corresponds to a reduction in the planetary drive of 250:1. Hence the control shaft must make about 100 revolutions while the driven shaft makes the swing by 150°.

Figure 2:
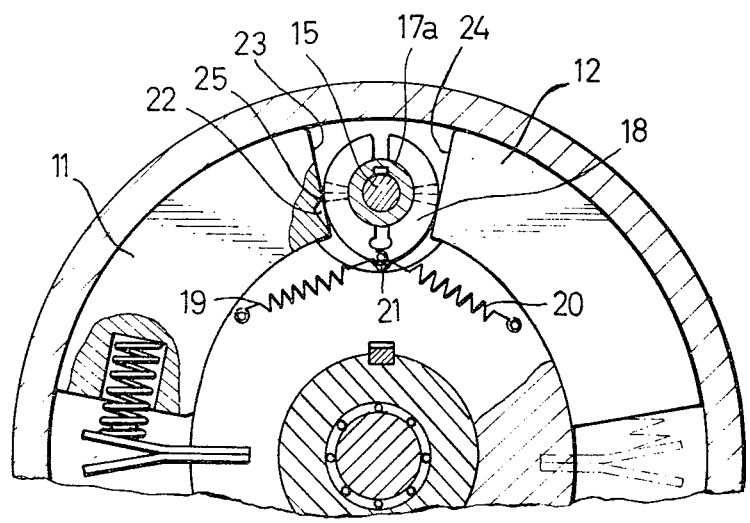
FIG. 2 shows a partial cross section through a hinge lock in accordance with the present invention in the zone of the tangential key free-wheeling along line II—II in FIG. 3.
Figure 3:
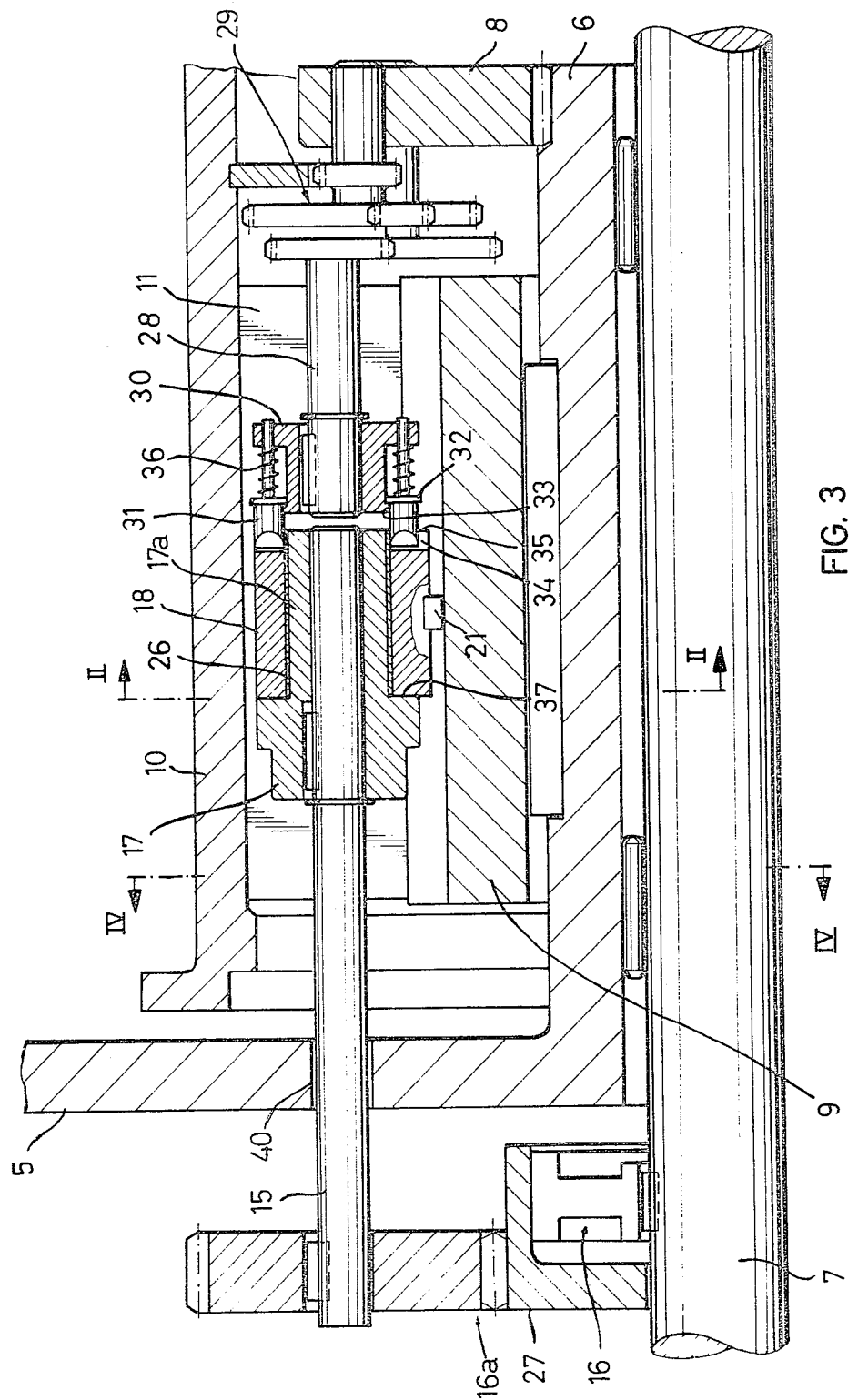
FIG. 3 shows a lengthwise section through the hinge lock.
Figure 4:
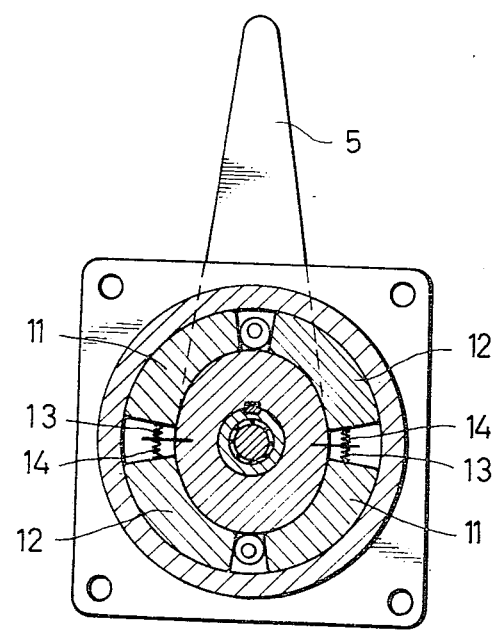
FIG. 4 shows a section along line IV—IV in FIG. 3.

In order to prevent free movement of the hinge in case of failure of the control force or a breakdown of the drive between the control shaft 7 and the driven shaft 6, which might lead to dangerous flutter, the invention provides for a hinge lock whose first embodiment is shown in FIGS. 2 to 4.

The driven shaft 6 is connected via a planetary drive (not shown) of which only a planetary (epicyclic) unit 8 is shown, to the control shaft 7 which passes centrally through the driven shaft 6 where—as described above—through the reduction of this drive the driven shaft 6 rotates much slower, but with a correspondingly higher adjusting force than the primary control shaft 7.

By means of a key connection, a central symmetrical out-of-round rotating body 9 is fixed to the driven shaft 6. This rotating body 9, together with the fixed housing 10, provides keyways for tangential keys 11 and 12 facing each other and locking in one direction of rotation. To avoid one-sided radial forces and asymmetrical loads, the tangential keys 11 and 12 are staggered in pairs by 180°. This corresponds to the combination of two tangential free-wheel clutches, acting in opposite directions, with the result that the tangential keys 11 and 12, forced by their restoring springs 13 and 14, respectively, into a locked position prevent a rotation of the driven shaft in either direction. However, to allow a desired rotation of the driven shaft in a control case, the tangential key 11 or 12 blocking in this direction must be unlocked (moved out) by external adjusting devices. For this purpose, a first auxiliary shaft 15 is provided in the embodiment shown in FIGS. 2 to 4. This auxiliary shaft 15 is driven via a drive 16a, containing a centrifugal clutch 16, by the primary control shaft 7. This drive 16a is expediently designed so that it simultaneously causes a certain gear reduction so that the speed of the first auxiliary shaft 15 is still much higher than that of the driven shaft 6. The first auxiliary shaft 15 which is always located between two oppositely directed tangential keys 11 and 12 parallel to the primary control shaft 7 and to the driven shaft 6, carries a fixedly keyed rotation element 17 which has a reduced-diameter portion 17a. On this reduced-diameter portion 17a a cam element 18 is mounted with clamping in the manner of a shoe brake. Between this cam element 18 and the portion 17a and hence the first auxiliary shaft 15 there exists a slip clutch effect. The cam element 18 is held by restoring springs 19 and 20, shown only schematically in FIG. 2, in its neutral middle position in which the deflection cam points inwards to the drive shaft, i.e., the two tangential keys 11 and 12 are easily forced by their restoring springs 13 and 14 into the prevailing clamping position. During rotation of the control shaft 7, the first auxiliary shaft 15 rotates and via the slip clutch effect takes along the cam element 18 in the direction of rotation, against the force of restoring spring 19 or 20, deflecting a tangential key 11 or 12, respectively so that in this direction the elliptical rotating body 9 and hence the driven shaft 6 is released and can rotate. The higher speed of the first auxiliary shaft 15 over the speed of the driven shaft ensures that when the control shaft 7 starts to turn, the involved tangential key 11 and 12 has already been unlocked before the much slower turning driven shaft has been appreciably set in motion. Thus the tangential key is prevented in the normal case from being engaged before the pickup element releasing it becomes effective.

The cam element 18 is taken along in the prevailing direction of rotation of the auxiliary shaft 15 only till a shortened pivoting limiting stop in the form of a projecting lug 21, which slides in a curved groove 22 of the face surface 23, strikes its end limiting surface 25. The force, required to further rotate the cam element 18 with continued backshifting of the tangential key 11 or 12 by the lug 21, is greater than the clamping force of the friction coupling so that, after the lug strikes the end limiting surface 25, the cam element 18 slips through on the rotation element portion 17a which has a coating 26.

If the primary control shaft stands still due to a fracture or a failure of the drive motor, primary auxiliary shaft 15 also stands still. Hence the deflection force from the slip clutch on the cam element 18 is absent; the latter is returned by the restoring spring 19 or 20, respectively, to its neutral rest position as shown in FIG. 2. In this process, the tangential key 11 or 12 is moved by its spring 13 or 14 back to the locked position and the drive shaft is instantaneously blocked. During the return of the cam element 18 by its restoring spring 19 or 20, the rotation element 17 and the first auxiliary shaft 15 is taken along, since the friction force of the slip clutch is necessarily greater than the restoring force of the spring. To avoid having to rotate the primary control shaft (which would be impossible because of the high speed ratio), the previously mentioned centrifugal clutch 16 is provided; when control shaft 7 stands still, the control shaft is uncoupled from the input gear 27 of drive 16a.

Coaxially with the first auxiliary shaft 15, the first embodiment shown in FIGS. 2 to 4 has a second auxiliary shaft 28 which is driven via a gear drive 29 (shown only schematically) by the driven shaft 6 synchronously with the first auxiliary shaft 15. A bearing element 30, connected in a rotation-proof manner to the second auxiliary shaft, carries clamping bolts 31 directed parallel to the auxiliary shafts 15 and 28. These clamping bolts are preloaded by springs in the direction towards the cam element 18, with their displacement in this direction being restricted by a stop 32 and a counterstop 33 on the bearing element 30. The restriction is chosen in such a way that the clamping bolts project into recesses 34 of face surface 35 of the cam element, but make no contact with it. In case of a breakdown in the drive between the control shaft 7 and the driven shaft 6, the speed of driven shaft 6 changes, with the result that the synchronism of rotation between the two auxiliary shafts 15 and 28 becomes lost. Hence the clamping bolts 31 slide from the recesses 34 and press with the force of their preload springs 36 against the face surface 35 of cam element 18. The latter is pressed with its other face surface against a ring shoulder 37 of the rotation element 17 which is connected in a rotation-rigid manner with the first auxiliary shaft 15. The spring constant of spring 36 is selected such that the resulting friction-clutch coupling between the cam element 18 and the ring shoulder 37 is sufficient so that the lug 21 contacting the counterstop surface 35 pushes back the tangential key 11 or 12, respectively and the cam element is thus rotated excessively; the cam portion carrying the lug 21 virtually gets into the position adjusted by 180° upwardly in relation to FIG. 2. The tangential key, previously in release position, is thus pushed by its spring 13 or 14 into its locked position and hence the driven shaft 6 is again blocked instantaneously. It is self-explanatory that the shafts 15 and 28 are facing each other in pairs and are 180° apart, in order to provide in the pairwise arrangement of tangential keys 11 and tangential keys 12 that always both tangential keys acting in one direction are unlocked and locked again.

Figure 5:
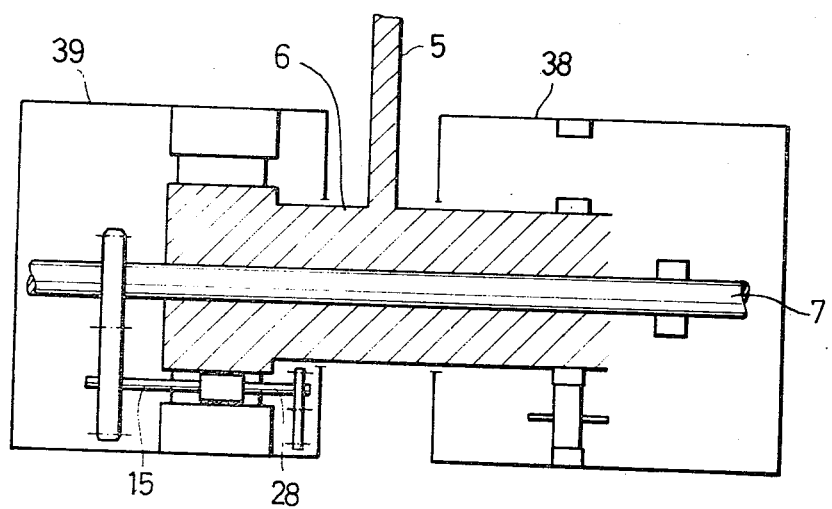
FIG. 5 shows a schematic view of the construction of a hinge lock in accordance with the present invention with two-bearing control shaft and driven shaft.

In the embodiment according to FIGS. 2 to 4, the planetary gear drive and the tangential key lock are accommodated in a housing requiring a sealing (not shown in detail). Of course, it is also possible to accommodate these parts in two separate housings. For example, with control shaft 7 and driven shaft 6, bearing-mounted on both ends as shown in FIG. 5, the arrangement may be such that the drive between the control shaft and driven shaft is in the zone of one bearing location, while the tangential key free-wheel lock and the auxiliary shafts for their actuation are in the vicinity of the other bearing location. This makes it possible (see FIG. 5) to place the drive gear and the hinge lock in completely separate housings 38 and 39. This does away with the special sealing of the face surface of the housing from the auxiliary shaft 15 passing through it, as is the case with the one-sided location according to FIGS. 2 to 4. In the same manner, it is not necessary to provide an arc-shaped slot in control element 5 whose center angle corresponds to the desired adjustment angle.

Figure 6:
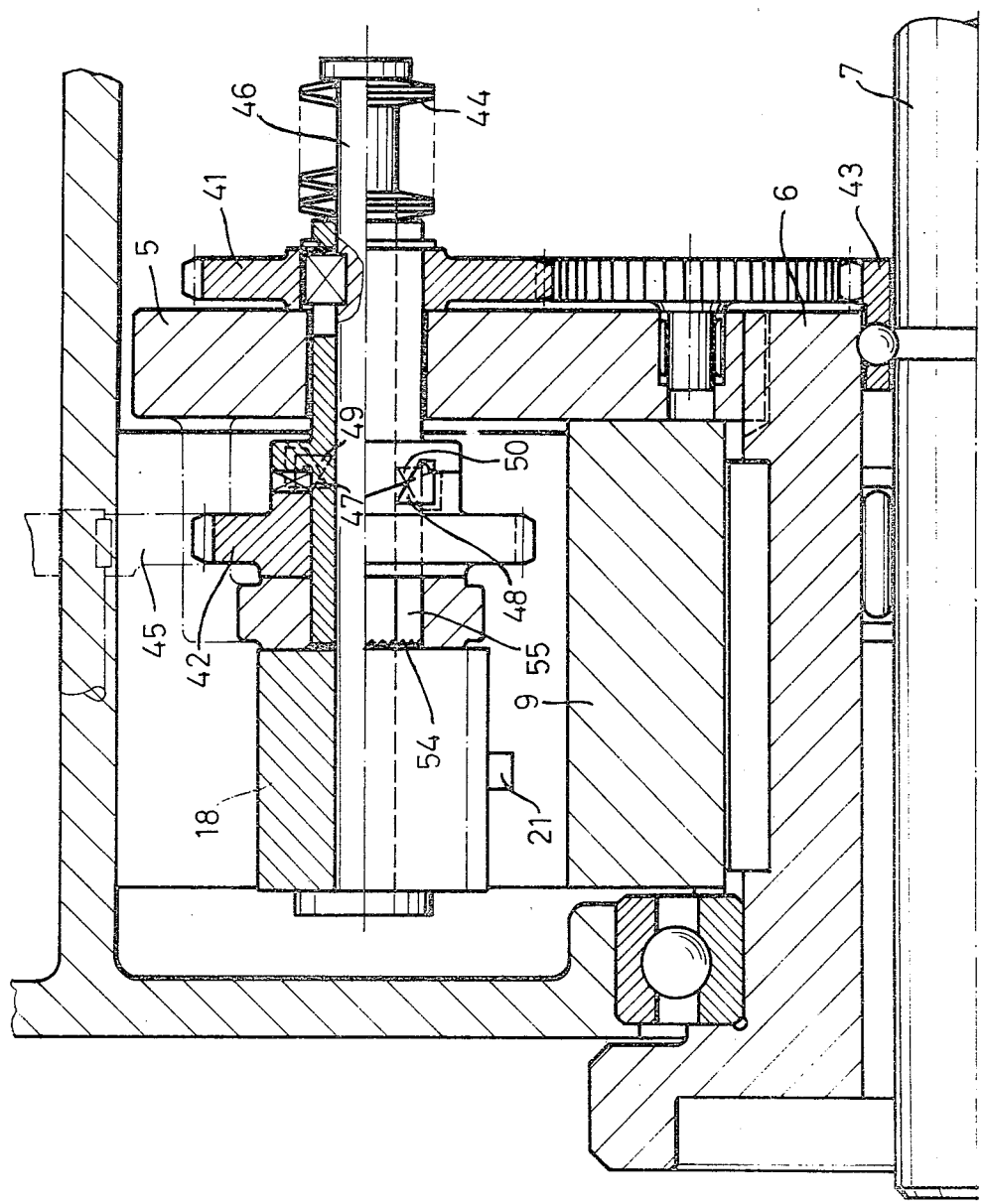
FIG. 6 shows a section, corresponding to FIG. 3, taken through a second embodiment of the hinge lock in accordance with the present invention.

The sealing of the housing face surface can also be avoided as shown in FIG. 6. The drive of the first auxiliary shaft is not connected at the outer face end of the control shaft, but at the ball bearing race 43 between control shaft 7 and driven shaft 6. The gears 41 and 42 are coupled by the face clutch shown in both directions, with the drive for the gear 41 being derived from control shaft 7 or the ball race 43, while gear 42 is driven by the drive shaft 6 via an intermediate gear. Both gears 41 and 42 normally run synchronously, due to the fact that the drive shaft and the driven shaft are positively connected by a drive.

When gear 41 starts to turn, it rotates relative to gear 42 and slips axially on the face key (claw) so that spring set 44 is loaded with greater force. The restoring springs 19 and 20 for the key releasing cam element 18 always hold it in the middle position if the control shaft 7 stands still, so that the tangential keys immediately lock the hinge, since the preload force of springs 19, 20 is greater than that of the plate spring set 44. In case of failure, i.e., stoppage of the control shaft, the spring set 44 is relaxed again, gear 42 slips on the key surface and turns the gear in the previously initiated direction of rotation which is made possible by slippage on bolt 46 or by a gear tooth play with the gear 45. This gear play can be increased by omitting every second tooth in one of gears 42 or 45.

With a loaded spring set 44 the cam element 18 is taken along by face-side friction contact up to the limit stop, as in the embodiment according to FIGS. 2 to 4, and releases the tangential key to be lifted in accordance with the direction of rotation. In the absence of the control force, the friction contact is immediately discontinued and the cam element moves to the middle position, i.e., the tangential key locks. It is expedient to provide radial serrations 54 between the cam element 18 and the claw hollow shaft 55, in order to insure positive and thus instant pickup of cam element 18 when gear 41 turns.

On the periphery of the jaw clutch are four additional cams 47, 48, 49, 50 of which always two, namely 47, 48 or 49, 50 correspond for the two directions of rotation, so that they function as 45° stop and ensure that the synchronously running gear 42, if it lags behind the drive, is taken along (it slips on the bolt 46); on the other hand, during a failure within the main drive between the control shaft 7 and the driven shaft 6 the gear 42, now released, jumps over cams 48, 49 with greater force (wind pressure on the slats) and thus further tensions the spring set 44 so that the limit stop of the cam element releases the tangential key even further. Conditions are exactly the same as was described in connection with the description of drive failure lock in the first embodiment.

Figure 7:
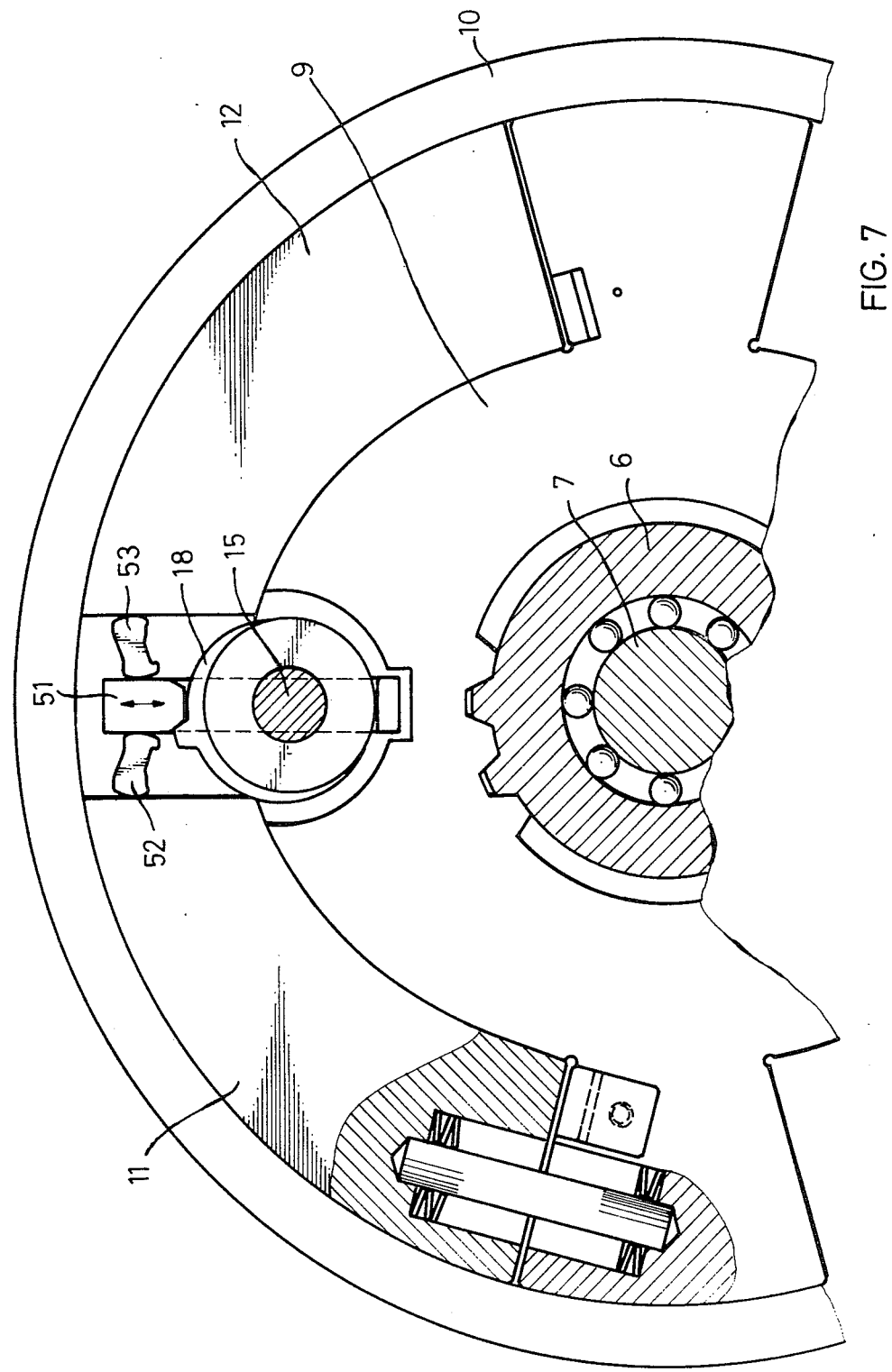
FIG. 7 shows a partial cross section, corresponding to FIG. 2, through a third embodiment of a hinge lock in accordance with the present invention where the wedge separation proceeds indirectly via a trip cam by means of roll-in spreaders.

FIG. 7 shows an embodiment of a hinge lock in accordance with the present invention where the cam element 18 actuates the tangential keys 11 and 12, respectively, not directly, but indirectly via a control plate 51 and spreaders 52 and 53 in contact with it. This indirect deflection of the tangential keys 11 and 12 results in a considerable force transmission, i.e., the forces transmitted from the spreaders 52, 53 to the tangential keys 11 and 12 are considerable, for example, by one order of magnitude larger than the controlling force of the cam element 18. As a result, even with engaged tangential keys (particularly the repeatedly discussed case of temporary stoppage of the slats during their retraction) the tangential keys can be safely released.

Figure 8:
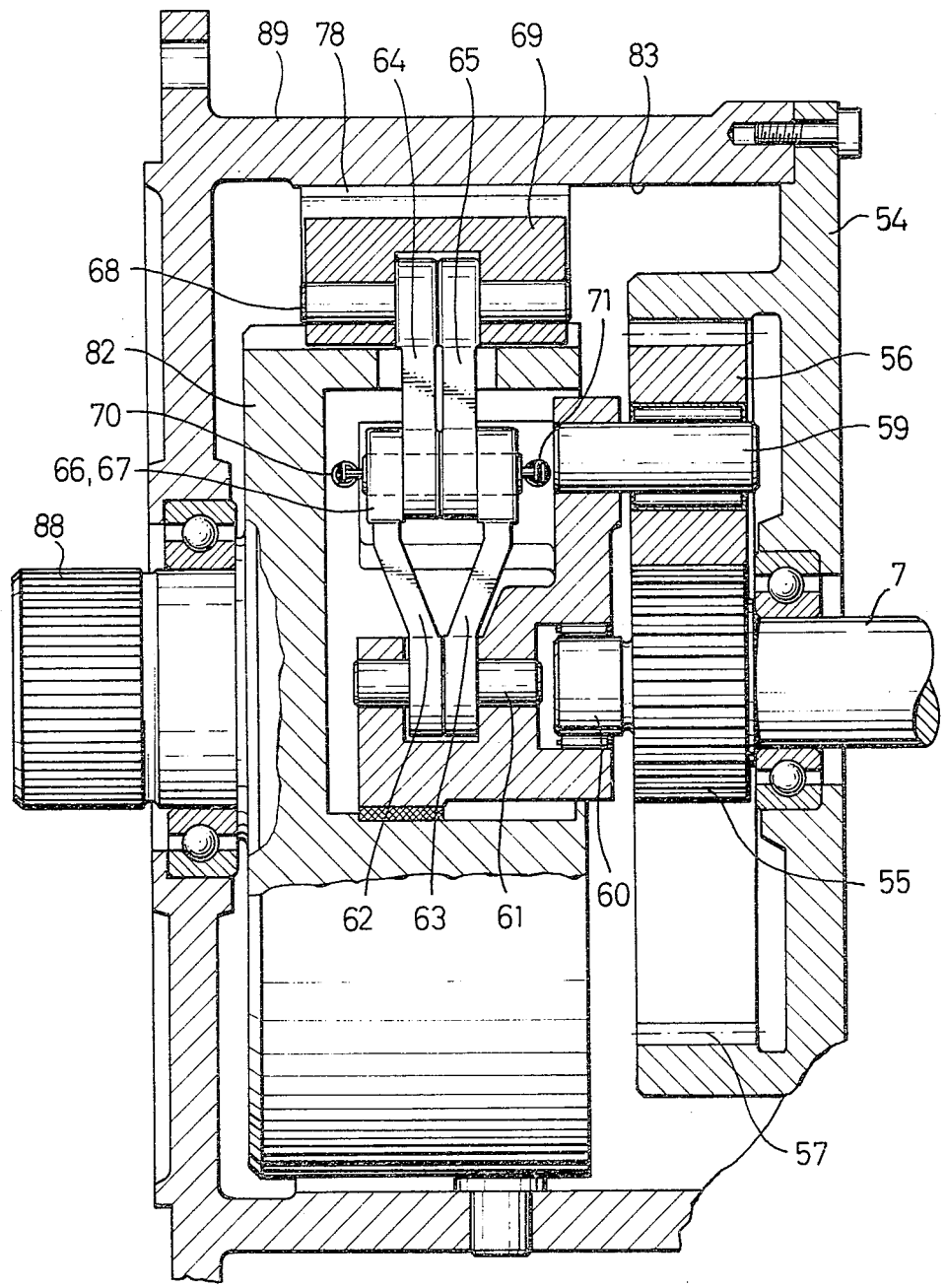
FIG. 8 shows a partial lengthwise section through a fourth embodiment of a hinge lock in accordance with the present invention.
Figure 9:
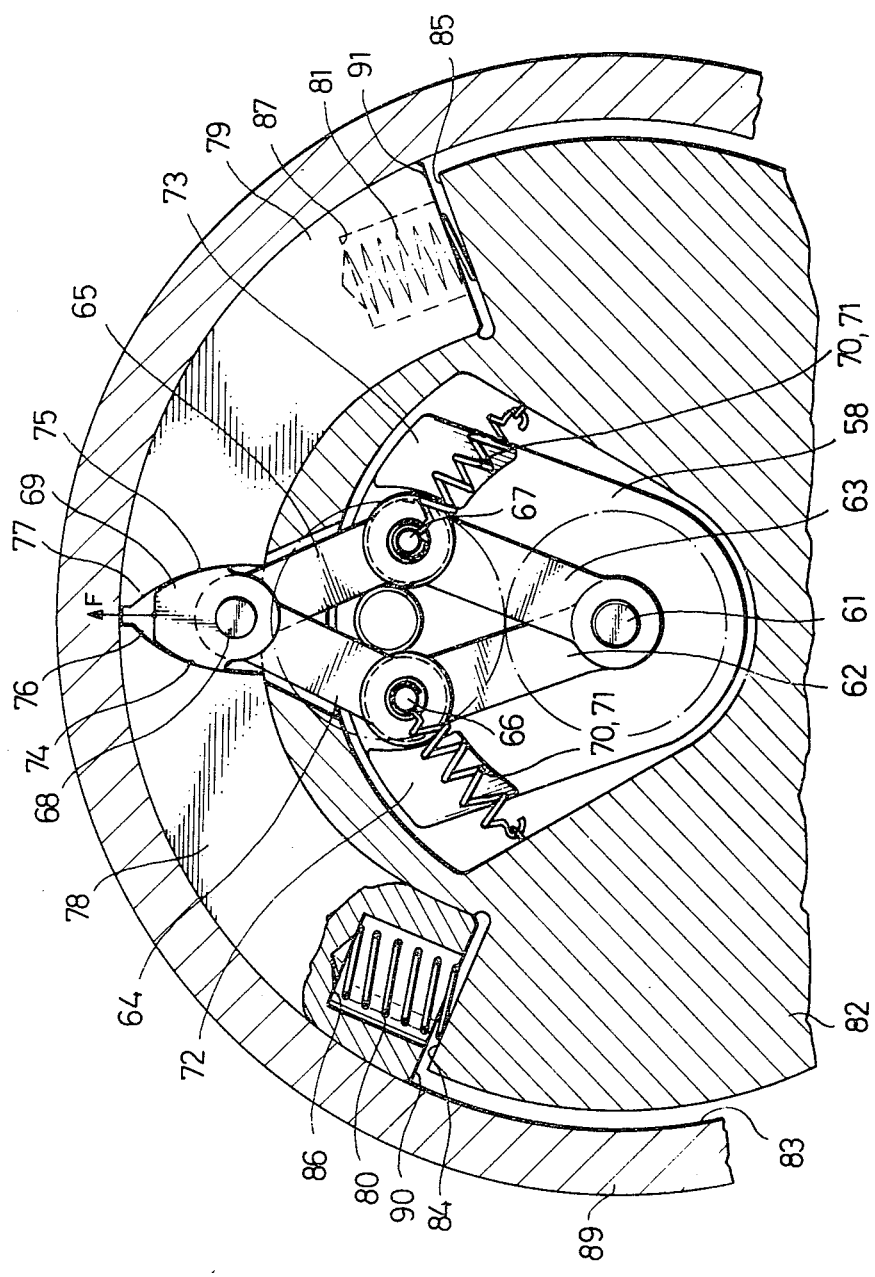
FIG. 9 shows a partial cross section of the embodiment shown in FIG. 8.
Figure 10:
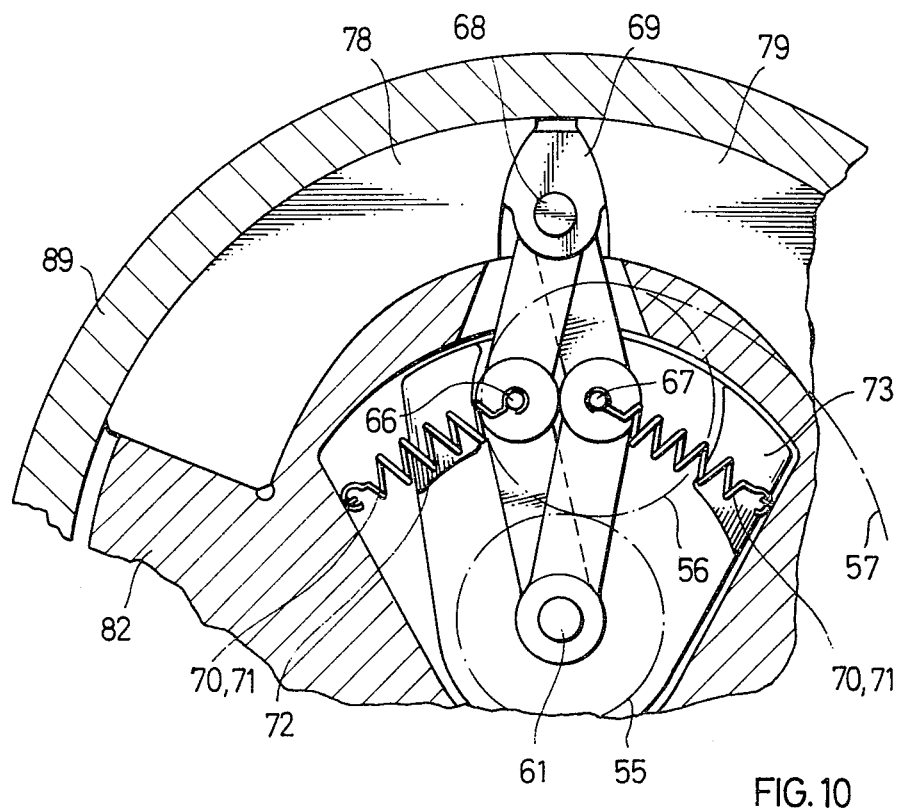
FIG. 10 shows a partial cross section corresponding to FIG. 9 in a different operating position.

FIGS. 8, 9 and 10 show an embodiment of the hinge lock in accordance with the present invention, which operates by the tooth pressure pendulum principle. A force transmission is provided between pendulum arm and the key release. The primary control shaft 7, mounted in cover 54, are rigidly connected to the central 55 which drives the planet pinion 56 via the sun gear 57. The planet carrier 58, acting as pendulum arm, with the bearing trunnion 59 of the planet pinion is, in turn, arranged around the shaft trunnion 60 of control shaft 7. In the planet carrier 58 is another joint bolt 61 around which the two parallelogram arms 62, 63 are pivoted. Two additional parallelogram arms 64, 65 are connected on their other ends by means of a bolt 68 to each other and the sliding key 69 acting as key release. Tension springs 70, 71, engaging bolts 66, 67, provide for a spreading of parallelogram 62, 63, 64, 65 until they are stopped by stops 72, 73 on the planet carrier 58, with bolts 66, 67 connecting parallelogram arms 62, 64 and 63, 65.

The key surfaces 74, 75 of sliding key 69 rest against the face flanks 76, 77 of the two tangential keys 78, 79 which, in turn, are pressed by compression springs 80, 81 into the keyway formed between the rotating body 82 and the housing interior cylinder 83. The compression springs 80, 81 rest against the contact surfaces 84, 85 of rotating body 82 on one end and in blind holes 86, 87 of tangential keys 78, 79. The rotating body 82 simultaneously constitutes the driven side with the shaft trunnions 88 and is located in housing 89.

If the drive shaft 7 rotates in either direction, the parallelogram linkage 62, 63, 64, 65 is pushed together by one of the stops 72, 83, connected with the planet carrier 58 and moved by it due to tooth pressure (see FIG. 10) and the sliding key 69 is moved in direction F. The tangential keys 78, 79 are pushed apart, till their face surfaces 90, 91 contact support surfaces 84, 85 of the rotating body 82. The play resulting now between tangential key 78, 79, rotating body 82 and housing interior cylinder 83 permits the driven end 82, 88 to move in the direction initiated by the driving end 7, 56, 57. In case of standstill or breakage of the control shaft 7, the springs 70, 71 press the parallelogram linkage 62, 63, 64, 65 apart till they hit stops 72, 73, the sliding key 69 is pulled back and the tangential keys 78, 79 again drop into the locked position of the driven shaft 82, 88, and the planet carrier 58 returns to the middle position.

Figure 11:
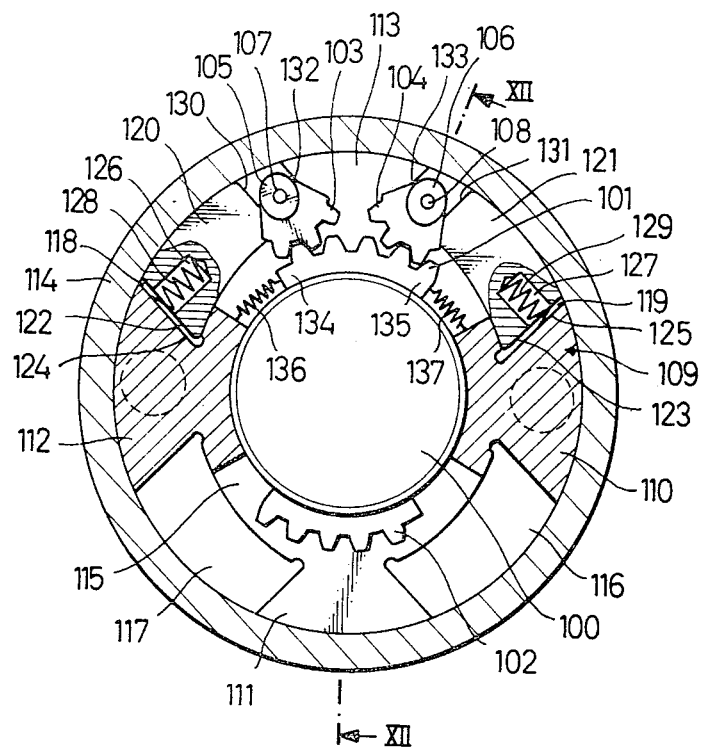
FIG. 11 shows a cross section through a fifth embodiment of the hinge lock in accordance with the present invention.
Figure 12:
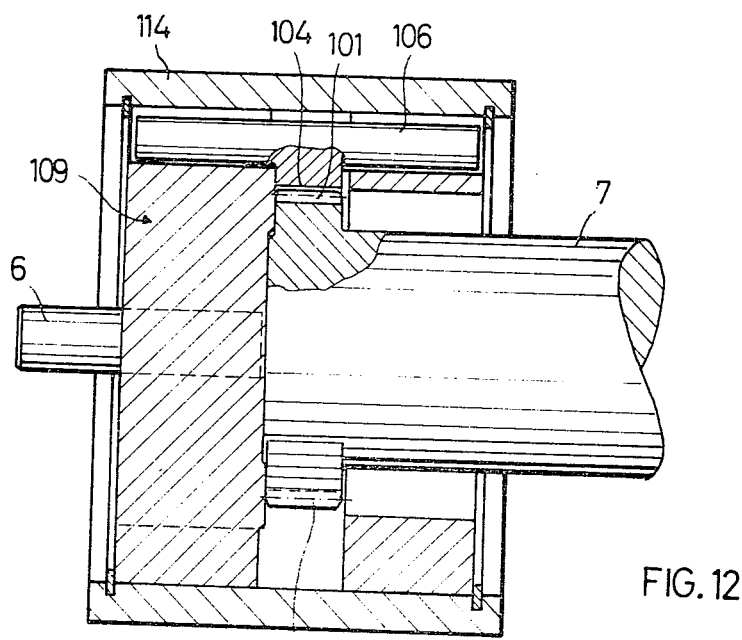
FIG. 12 shows a section taken along line XII—XII of FIG. 11.

In the embodiment shown in FIGS. 11 and 12, the engaging element 100 which is circle-shaped, is connected rigidly with the control shaft 7. Tooth segments 101 and 102 are arranged on engaging element 100, on top and at the bottom in FIG. 11. Each tooth segment 101, 102 engages toothed plates 103, 104 which are rigidly mounted on an eccentric 105, 106. Of the total four tooth plates 103, 104 and eccentrics 105, 106, FIG. 11 shows only the upper two, for the sake of simplicity. Each eccentric 105, 106 is seated, together with the associated tooth plate 103, 104, on a rotary axis 107, 108. These rotary axes 107, 108 are mounted with a certain play on the cross-wheel (Maltese cross) shaped rotating body 109 which is connected directly to the driven shaft 6. Between the arms 110, 111, 112, 113 of this cross-wheel-shaped rotating body 109 and the cylinder-shaped housing 114 and the elliptical interior body 115 of the rotating body 109, four recesses 116, 117, 118, 119 are formed. In the key gaps thus formed there are tangential form keys 120, 121, of which again only two are shown. These tangential form keys 120, 121 can be pulled in a known manner in a direction of rotation, namely the locking direction, into the key gap and thus block the rotation of the rotating body 109 and hence also the rotation of the driven shaft 6 connected thereto. The left-hand tangential key 120, to the left in FIG. 11, impedes the left-hand rotation, while the right-hand tangential key 121 impedes the right-hand rotation. One face side 122, 123 of each tangential key 120, 121 adjoins a shoulder 124, 125 of the cross-wheel arms 110, 112 of the rotating body 109. This applies analogously to the bottom tangential keys not shown in FIG. 11. Each tangential key 120, 121 has a bore 126, 127. Each bore seats a helical spring 128, 129 which rests against the bottom of the bore 126, 127 and against the shoulders 124, 125 and thus presses the tangential keys 120, 121 away from the shoulders 124, 125 outwardly into the locked position. The free face side 130, 131 of the tangential keys 120, 121 contacts an eccentric 105, 106, with opposite flanks of the eccentrics contacting shoulders 132, 133 of the Maltese cross arm 113 of rotating body 109. Between Maltese cross arm 112, 110 and the two ends 134, 135 of the tooth segment 101, one helical tension spring 136, 137 is located.

The control shaft 7, connected to the illipsoid engaging element, engages the driven shaft 6, which is connected to rotating body 109, with a certain play, namely that between the shoulders 124 and 125 of the Maltese cross arms 112 and 110, on the one hand, and the face surfaces 122 and 123 of tangential keys 120 and 121 on the other hand. Based on the basic position shown in FIG. 11, an assumed left-hand rotation of control shaft 7 and hence of engaging element 110 leads to a deflection of tooth plates 103 and 104 and hence also of eccentrics 105, 106. The eccentric axes 107, 108 yield with a certain play, eccentrics 105, 106 rest against the shoulders 132 and 133 of the Maltese cross arm 113 and press against the free face sides 130, 131 of tangential keys 120, 121 so that these are placed in the release position against the force of springs 128, 129 and hence permit a rotation of the rotating body 109 and the driven shaft 6 connected thereto; the force transmission for an assumed lefthand rotation proceeds from tooth segment 101 to tooth plate 103, from there to the eccentric 130, from there to the face side 105 of tangential key 120, and through the latter's face side 122 to the shoulder 124 of Maltese cross arm 112.

As soon as the rotation of control shaft 7 has ended, the basic position between engaging element 100 and rotating body 109 is restored by restoring devices. This can be done, for example, by a return run of the gear drive, or by various other conceivable restoring devices; FIG. 11 shows springs 136, 137 as an example. In this basic position, which always prevails when control shaft 7 stands still, the tangential keys 120, 121 ensure the arrest of rotating body 109 and hence of driven shaft 6. A particular advantage of this arrangement is that the function of the driven can be maintained even when the driven shaft 6 and hence the rotating body are acted on by forces which accelerate the rotating body relative to the engaging element 100 and to the control shaft 7.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A hinge lock for locking a driven shaft during standstill of a primary control shaft, particularly for the control hinges of slats on aircraft, comprising: a primary control shaft; a driven shaft actuating a control element; said driven shaft being connected by gear means to said control shaft; a tangential key free-wheel lock connected to said driven shaft; said free-wheel lock comprising at least two oppositely directed tangential keys and locking in one direction of rotation; an engaging element driven by said primary control shaft; a key release shifted by said engaging element between said tangential keys depending on the direction of rotation.

2. A hinge lock as defined in claim 1 including a high-speed auxiliary shaft; a rotating member on said tangential key free-wheel lock; transmission means connected between said primary control shaft and said auxiliary shaft such that the speed of said auxiliary shaft is a multiple of the speed of said rotating member.

3. A hinge lock as defined in claim 1 including a stationary housing with a cylindrical interior wall, said driven shaft having a center-symmetrical out-of-round portion forming with said interior wall a key gap for said oppositely directed tangential keys.

4. A hinge lock as defined in claim 1 wherein said tangential keys are spring-loaded in locking direction.

5. A hinge lock as defined in claim 2 including clutch means, said key release comprising a control element which can be shifted from said auxiliary shaft by said clutch means against action of a spring from a middle position and engaging one of said tangential keys.

6. A hinge lock as defined in claim 2 including a pivot limit stop, said key release comprising a cam element coupled with said auxiliary shaft and having said pivot limit stop.

7. A hinge lock as defined in claim 1 including centrifugal clutch means connected between said primary control shaft and said engaging element, said centrifugal clutch means upon failure of said control shaft drive breaking the connection between said control shaft and said engaging element.

8. A hinge lock as defined in claim 1 including roll-in spreaders; a trip cam for actuating a control plate to release said tangential keys by said roll-in spreaders.

9. A hinge lock as defined in claim 2 including a radially deformable slip ring as key release between said rotating member of said tangential key free-wheel lock and said tangential keys for rotating with a different angular speed in free-wheel direction than said rotating member.

10. A hinge lock as defined in claim 9 including two slip rings for said keys of one locking direction, said slip rings being connected with said control shaft such that each slip ring always revolves in one direction independent of the sense of rotation of said control shaft.

11. A hinge lock as defined in claim 1 including an intermediate gear in said gear means and pivotally mounted between said control shaft and said driven shaft, said pivotally mounted gear entering as key release between said tangential keys.

12. A hinge lock as defined in claim 11 including force transmission means between said key release and pivot mounting of said intermediate gear.

13. A hinge lock as defined in claim 12 wherein said transmission means comprises a parallelogram linkage having one hinge bolt connected to a planet arm and having another hinge bolt connected to a sliding key; compression spring means for pressing the parallelogram arms against lateral stops connected to a planet carrier; and two lateral hinge bolts connected to said compression spring means.

14. A hinge lock as defined in claim 2 including a second auxiliary shaft driven by said driven shaft by said transmission means in synchronism with said first auxiliary shaft and being coupled therewith so that with loss of synchronism said tangential keys are disconnected by said first auxiliary shaft and are shifted to locking position.

15. A hinge lock as defined in claim 14 including cam means, said first and said second auxiliary shafts being coupled so that with relative displacement of said auxiliary shafts said cam means is driven to a release position.

16. A hinge lock as defined in claim 15 wherein said second auxiliary shaft has axially shiftable clamping bolts; stop means in recesses of a face surface of said axially shiftable cam element, said shiftable clamping bolts contacting said stop means under spring action; and a ring shoulder on said first auxiliary shaft contacting another face surface of said axially shiftable cam element.

17. A hinge lock as defined in claim 1 including a plurality of said tangential keys coupled for joint disengagement for each direction of rotation.

18. A hinge lock as defined in claim 1 wherein said engaging element is rigidly connected to said control shaft and engages said driven shaft with play; said engaging element having at least one tooth segment; at least two pivotally mounted eccentric elements on a rotating member connected to said driven shaft and engaging said tooth segment; said tangential keys having each a free face side contacted by one of said eccentric elements; and spring means for forcing said tangential keys away from a shoulder of said rotating member into a release position.

19. A hinge lock as defined in claim 18 wherein said rotating member has at least two cams engaging a corresponding recess in each tangential key.

* * * * *